United States Patent
Guy et al.

(10) Patent No.: US 8,664,311 B2
(45) Date of Patent: *Mar. 4, 2014

(54) RUBBER COMPOSITIONS COMPRISING TWO DIFFERENT COUPLING AGENTS AND ALSO INORGANIC FILLERS

(75) Inventors: Laurent Guy, Lyons (FR); Michel Fernandez, Lyons (FR); Sebastien Sterin, Saint Cyr Au Mont D'or (FR)

(73) Assignee: Rhodia Chimie, Aubervilliers (FR)

( * ) Notice: Subject to any disclaimer, the term of this patent is extended or adjusted under 35 U.S.C. 154(b) by 813 days.

This patent is subject to a terminal disclaimer.

(21) Appl. No.: 11/920,994

(22) PCT Filed: May 18, 2006

(86) PCT No.: PCT/FR2006/001120
§ 371 (c)(1), (2), (4) Date: May 8, 2009

(87) PCT Pub. No.: WO2006/125891
PCT Pub. Date: Nov. 30, 2006

(65) Prior Publication Data
US 2009/0215952 A1    Aug. 27, 2009

(30) Foreign Application Priority Data
May 26, 2005  (FR) ..................................... 05 05286

(51) Int. Cl.
*C08K 5/24* (2006.01)
(52) U.S. Cl.
USPC ........... 524/262; 524/430; 524/437; 524/492; 524/571

(58) Field of Classification Search
USPC .......................... 524/262, 430, 437, 492, 571
See application file for complete search history.

(56) References Cited

U.S. PATENT DOCUMENTS

| 4,118,367 A | 10/1978 | Dawes et al. |
| 2003/0114601 A1 | 6/2003 | Cruse et al. |

FOREIGN PATENT DOCUMENTS

| FR | 2340323 | 2/1977 |
| FR | 2839720 A1 | 11/2003 |

OTHER PUBLICATIONS

International Search Report, Oct. 13, 2006.

*Primary Examiner* — Ling Choi
*Assistant Examiner* — Wenwen Cai
(74) *Attorney, Agent, or Firm* — Dentons US LLP

(57) ABSTRACT

Elastomer isoprene rubber compositions contain an effective amount of a polyfunctional coupling system (A) as an inorganic-elastomer filler coupling agent, and (B) at least one elastomer of natural or synthetic rubber; (C) an inorganic filler as reinforcing filler; (D) other conventional constituents or additives comprising one or more vulcanizing agent(s), the polyfunctional coupling system being of the constituents (A1) and (A2): (A1) is at least one coupling agent selected from among the functionalized organosilicon compounds of formula (I): $[(G^0)_3SiO_{1/2}]_m[(G^0)_2SiO_{2/2}]_n[G^0SiO_{3/2}]_o[Si O_{4/2}]_p[(G^2)_a(G^1)_a(Z-CO-N=N-CO-A)SiO_{(3-a-a'/2)}]_q$ and (A2) is at least one coupling agent selected among polysulfurated "symmetric" silanes, or sulfurated "asymmetric" silanes.

18 Claims, No Drawings

RUBBER COMPOSITIONS COMPRISING TWO DIFFERENT COUPLING AGENTS AND ALSO INORGANIC FILLERS

CROSS-REFERENCE TO PRIORITY/PCT APPLICATIONS

This application claims priority under 35 U.S.C. §119 of FR 05/05286, filed May 26, 2005, and is the United States national phase of PCT/FR 2006/001120, filed May 18, 2006 and designating the United States (published in the French language on Nov. 30, 2006 as WO 2006/125891A3; the title and abstract were also published in English), each hereby expressly incorporated by reference in its entirety and each assigned to the assignee hereof.

JOINT RESEARCH AGREEMENT

The disclosure and claims herein were made as a result of activities undertaken within the scope of a joint research agreement in effect on or before the date the claimed invention was made between Rhodia Operations and Michelin Recherche et Technique S.A.

The field of the present invention is that of the use of a combination of two very different types of coupling agents, as a coupling system (white filler—elastomer) in rubber compositions comprising an inorganic filler as reinforcing filler. The invention also relates to the elastomer compositions obtained by means of using said coupling system, and also to the elastomeric articles having a body comprising the above-mentioned compositions.

The types of elastomeric articles in which the invention is most useful are those that are especially subject to the following stresses: temperature variations and/or large-frequency stress variations in a dynamic regime; and/or a substantial static stress; and/or a large strain fatigue in a dynamic regime. Such types of articles are, for example: seals for household electrical appliances, supports acting as engine vibration extractors either with metallic armatures or with a hydraulic fluid inside the elastomer, cable sheaths, shoe soles and rollers for cable cars.

This has especially been made possible by virtue of the development of novel elastomeric compositions reinforced with specific inorganic fillers termed "reinforcing" fillers, of high dispersibility, which are capable of competing with conventional carbon black from a reinforcing viewpoint, and which also offer these compositions lower hysteresis, which is especially synonymous with a reduction in the internal heating of the elastomeric articles (for example such as those mentioned above) during their use, in service.

The implementation (or "processability") of rubber compositions containing such fillers nevertheless remains more difficult than for rubber compositions conventionally filled with carbon black. In particular, it is necessary to use a coupling agent, also known as a binder, whose function is to ensure the connection between the surface of the inorganic filler particles and the elastomer, while at the same time facilitating the dispersion of this inorganic filler in the elastomeric matrix.

It is recalled here that the term "coupling agent" (inorganic filler-elastomer) should be understood as meaning, in a known manner, an agent capable of establishing a sufficient connection, of chemical and/or physical nature, between the inorganic filler and the elastomer.

Such a coupling agent, which is at least bifunctional, has the simplified general formula "Y—W—X", in which:

Y represents a functional group (function "Y") capable of physically and/or chemically bonding to the inorganic filler, such a bond possibly being established, for example, between a silicon atom of the coupling agent and the surface hydroxyl (OH) groups of the inorganic filler (for example the surface silanols when it is silica);

X represents a functional group (function "X") capable of physically and/or chemically bonding to the elastomer, for example via a suitable atom or group of atoms;

W represents a divalent group allowing "Y" and "X" to be connected.

Coupling agents should in particular not be confused with simple agents for covering the inorganic filler, which, in a known manner, may comprise the function "Y" that is active towards the inorganic filler, but which in any case lack the function "X" that is active towards the elastomer.

Coupling agents, especially (silica-elastomer), have been described in a large number of patent documents, the most well known being bifunctional sulfurous silanes, in particular sulfurous alkoxysilanes, which are at the present time considered as being products that provide, for silica-charged vulcanizates, the best compromise in terms of scorching safety, ease of use and reinforcing power. Among these sulfurous silanes, mention should be made most particularly of bis(3-triethoxysilylpropyl)tetrasulfide (abbreviated as TESPT), which is the reference coupling agent in rubber compositions comprising an inorganic filler as reinforcing filler.

It is still sought at the present time to improve the performance qualities of these coupling agents for an inorganic filler such as, for example, silica.

In particular, the need is particularly present in the case of rubber matrices based on an isoprene elastomer in which, in a known manner, an effective bond with the elastomer is much more difficult to obtain, when compared with the use of carbon black.

Continuing its research, the Applicant has found a new inorganic-filler coupling system which by virtue of the combination of two very different types of coupling agents allows the coupling performance qualities on an isoprene elastomer to be improved in a very substantial way. A system of this kind makes it possible in particular to achieve a notable improvement in the hysteresis properties of rubber compositions, which is manifested, for the elastomeric articles (such as those mentioned above, for example), in a decrease in the internal heating of these articles in the course of their use, in service, or in an increase in the transmissibility factor in the case of anti-vibration components in engine supports.

FIRST SUBJECT OF THE INVENTION

This objective, among others, is achieved by the present invention, which concerns, in a first subject, the use:

of an effective amount of a polyfunctional coupling system
(A) (inorganic filler-elastomer), bearing at least two functions noted "X" or "Y", which may be grafted on the one hand onto the elastomer by means of the function "X", and on the other hand onto the inorganic filler by means of the function "Y";

as inorganic filler-elastomer coupling agent in rubber compositions comprising:
(B) at least one elastomer of natural or synthetic rubber type;
(C) an inorganic filler as reinforcing filler;
(D) all or part of the other constituents or additives chosen from: one (or more) curing agent(s) (D1), optionally one (or more) curing accelerator(s) (D2), optionally one (or more) curing activator(s) (D3), optionally one (or more) non-white reinforcing filler(s) (D4), optionally one (or more) non-reinforcing or sparingly reinforcing inorganic filler(s) (D5), optionally one (or more) protecting agent(s) (D6), optionally one (or more) plasticizer(s) and/or one (or more) implementation aid(s) (D7), and mixtures of these species;

said use being characterized in that:

the polyfunctional coupling system (A) consists of a particular combination residing in the combination of the ingredients (A1) and (A2) below:

(A1) being at least one coupling agent chosen from the group of coupling agents in which each member is a compound constituted essentially of a functionalized organosilicon compound (I) comprising the units having the following general formulae:

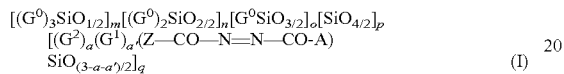

in which:

m, n, o and p each represent an integer or fraction greater than or equal to 0;

q represents an integer or fraction greater than or equal to 1;

a represents an integer chosen from 0, 1, 2 and 3;

a' represents an integer chosen from 0, 1 and 2;

the sum a+a' is in the range from 0 to 3, with the conditions according to which: when a=0, then at least one of the symbols $G^0$ corresponds to the definition given below for $G^2$; and when a+a'=3, then m=n=o=p=0 (zero);

the symbols $G^0$, which may be identical or different, each represent one of the groups corresponding to $G^2$ or $G^1$;

the symbols $G^2$, which may be identical or different, each represent: a hydroxyl group or a hydrolyzable monovalent group;

the symbols $G^1$, which may be identical or different, each represent: a saturated or unsaturated aliphatic hydrocarbon-based group; a saturated or unsaturated and/or aromatic, monocyclic or polycyclic carbocyclic group; or a group representing a saturated or unsaturated aliphatic hydrocarbon-based part and a carbocyclic part as defined above; with the additional possibility according to which, where appropriate, a group $G^1$ may form, with a group $G^2$ and the silicon atom to which $G^1$ and $G^2$ are attached, a monocyclic or polycyclic carbocyclic group containing from 2 to 10 ring carbon atoms and possibly comprising one or more ring oxygen heteroatom(s);

the symbol Z represents a divalent radical chosen from: a saturated or unsaturated aliphatic hydrocarbon-based group; a saturated, unsaturated and/or aromatic, monocyclic or polycyclic carbocyclic group; and a group containing a saturated or unsaturated aliphatic hydrocarbon-based part and a carbocyclic part as defined above; said divalent radical being optionally substituted or interrupted with an oxygen atom and/or a sulfur atom and/or a nitrogen atom, said nitrogen atom bearing one monovalent group chosen from: a hydrogen atom; a saturated or unsaturated aliphatic hydrocarbon-based atom; a saturated or unsaturated and/or aromatic, monocyclic or polycyclic carbocyclic group; and a group containing a saturated or unsaturated aliphatic hydrocarbon-based part and a carbocyclic part as defined above;

the symbol A represents:

a saturated or unsaturated aliphatic hydrocarbon-based group; a saturated or unsaturated and/or aromatic, monocyclic or polycyclic carbocyclic group; or a group representing a saturated or unsaturated aliphatic hydrocarbon-based part and a carbocyclic part as defined above;

a group —X-$G^3$ in which: X represents —O—, —S— or —N$G^4$- with $G^4$ taking any of the meanings given above for $G^1$; $G^3$, which may be identical to or different from $G^4$, represents any of the groups defined for $G^1$; the substituents $G^3$ and $G^4$ of the group —N$G^4G^3$ also possibly forming, together with the nitrogen atom to which they are attached, a single 5- to 7-membered ring comprising in the ring from 3 to 6 carbon atoms, 1 or 2 nitrogen atom(s) and optionally 1 or 2 unsaturated double bond(s);

or, when q=1, a group [—Z—SiO$_{(3-a-a')/2}$($G^2$)$_a$($G^1$)$_{a'}$] [($G^0$)$_3$SiO$_{1/2}$]$_m$[($G^0$)$_2$SiO$_{2/2}$]$_n$[$G^0$SiO$_{3/2}$]$_o$[SiO$_{4/2}$]$_p$ in which the symbols Z, $G^0$, $G^1$, $G^2$, a, a', m, n, o and p have the definitions given above;

(A2) being at least one coupling agent chosen from the group of coupling agents in which each member is a compound constituted essentially:

either of a polysulfur-containing "symmetrical" silane (A2-1) conforming to the general formula:

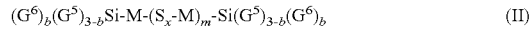

in which:

the symbols $G^6$ adopt any one of the meanings given above for $G^2$;

the symbols $G^5$ adopt any one of the meanings given above for $G^1$;

b represents an integer 1, 2 or 3;

m represents an integer 1 or 2;

x represents a whole or fractional number ranging from 2 to 6;

the symbols M adopt any one of the meanings give above for Z;

or of a sulfur-containing "asymmetric" silane (A2-2) conforming to the general formula:

in which:

the symbols $G^6$, $G^5$, b and M conform to the definitions given above for the formula (II);

z represents a whole or fractional number ranging from 1 to 4;

the symbol J represents:

when z=1: a hydrogen atom or a group —CO—$R^1$;

when z is a whole or fractional number ranging from 2 to 4: a group —N$R^2R^3$ or a group Bzt or a group Bzt, (AA)y;

with: $R^1$ being a saturated or unsaturated aliphatic hydrocarbon-based group, or a saturated, unsaturated and/or aromatic, monocyclic or polycyclic carbocyclic group, or a group having a saturated or unsaturated aliphatic hydrocarbon-based part and a carbocyclic part as defined above; $R^2$ and $R^3$, which are identical or different, being a hydrogen atom and/or any one of the groups represented by $R^1$; $R^2$ and $R^3$ further being able to form, together and with the nitrogen atom to which they are attached, a single ring having 5 to 7 members, containing within the ring 3 to 6 carbon atoms, 1 or 2 nitrogen atom(s) and optionally 1 or 2 double bond(s); the symbol Bzt representing the 2-benzothiazole group optionally substituted by one or more radicals chosen from: a saturated aliphatic hydrocarbon-based group, or a saturated and/or aromatic, monocyclic or polycyclic carbocyclic group, or a group having a saturated aliphatic hydrocarbon-based part and a saturated and/or aromatic, monocyclic or polycyclic carbocyclic part; symbol AA representing an organic or inorganic, oxygen-containing monoacid or polyacid at least one of whose acid functions possesses an ionization constant in water, pKa, at 25° C., of more than 3; and y being a whole or fractional number other than 0 (zero) and not greater than 3;

said polyfunctional coupling system (A) is incorporated into rubber compositions based on isoprene elastomers.

For the purposes of the invention, the expression "functionalized organosilicon compound (I)" is intended to define the following compounds:

(i) at least one functionalized organosilane corresponding to formula (I) in which m=n=o=p=0 (zero), q=1 and a+a'=3;

(2i) at least one functionalized siloxane oligomer corresponding to formula (I) in which: the sum a+a' is then in the range from 0 to 2, and either at least one of the m, n, o and p is a number other than 0 (zero) and q is greater than or equal to 1, or q is greater than 1 and each of the m, n, o and p has any value; and (3i) a mixture of functionalized organosilane(s) (i) and/or of functionalized siloxane oligomer(s) (2i).

As regards the functionalized siloxane oligomers corresponding to formula (I), those that are advantageously targeted in the present invention are the species (2i) corresponding to the definitions given above, in formula (I), in which the sum m+n+o+p+q (corresponding to the number of silicon atoms in the oligomer) is in the range from 2 to 20 and preferably from 2 to 12, for example from 2 to 6.

In the abovementioned formula (I), it should be understood that the group (Z—CO—N═N—CO-A) is linked to the Si atom of the unit $SiO_{(3-a-a')/2}$ via the divalent radical —Z—.

In the abovementioned formula (I), the function "X" of the coupling agent is the activated azo function CO—N═N—CO, whereas the function "Y" is a hydroxyl/hydrolyzable function —Si-$G^0$ and/or —Si-$G^2$. In the abovementioned formula (II), the function "X" of the coupling agent is the polysulfide function $S_x$, whereas the function "Y" is the hydroxyl/hydrolyzable function —Si-$G^6$. In the abovementioned formula (III), the function "X" of the coupling agent is the polysulfide function $S_z$, whereas the function "Y" is the hydroxyl/hydrolyzable function —Si-$G^6$.

In the text appearing above, the term "aliphatic hydrocarbon-based group" means an optionally substituted linear or branched group preferably containing from 1 to 25 carbon atoms.

Advantageously, said aliphatic hydrocarbon-based group contains from 1 to 18 carbon atoms, better still from 1 to 8 carbon atoms and even better still from 1 to 6 carbon atoms.

Saturated aliphatic hydrocarbon-based groups that may be mentioned include alkyl groups such as methyl, ethyl, propyl, isopropyl, n-butyl, isobutyl, t-butyl, pentyl, isopentyl, neopentyl, 2-methylbutyl, 1-ethylpropyl, hexyl, isohexyl, neohexyl, 1-methylpentyl, 3-methylpentyl, 1,1-dimethylbutyl, 1,3-dimethylbutyl, 2-ethylbutyl, 1-methyl-1-ethylpropyl, heptyl, 1-methylhexyl, 1-propylbutyl, 4,4-dimethylpentyl, octyl, 1-methylheptyl, 2-ethylhexyl, 5,5-dimethylhexyl, nonyl, decyl, 1-methylnonyl, 3,7-dimethyloctyl, 7,7-dimethyloctyl and hexadecyl radicals.

The unsaturated aliphatic hydrocarbon-based groups comprise one or more unsaturations, preferably one, two or three unsaturations of ethylenic type (double bond) and/or acetylenic type (triple bond).

Examples of these are alkenyl or alkynyl groups derived from the alkyl groups defined above by removal of two or more hydrogen atoms. Preferably, the unsaturated aliphatic hydrocarbon-based groups comprise only one unsaturation.

In the context of the invention, the term "carbocyclic group" means an optionally substituted monocyclic or polycyclic radical, preferably of $C_3$-$C_{50}$-Advantageously, it is a $C_3$-$C_{18}$ radical, which is preferably mono-, bi- or tricyclic. When the carbocyclic group comprises more than one ring nucleus (in the case of polycyclic carbocycles), the ring nuclei are fused in pairs. Two fused nuclei may be ortho-fused or peri-fused.

Unless otherwise indicated, the carbocyclic group may comprise a saturated part and/or an aromatic part and/or an unsaturated part.

Examples of saturated carbocyclic groups are cycloalkyl groups. Preferably, the cycloalkyl groups are of $C_3$-$C_{18}$ and better still $C_5$-$C_{10}$. Mention may be made especially of cyclopentyl, cyclohexyl, cycloheptyl, cyclooctyl, adamantyl and norbornyl radicals.

The unsaturated carbocycle or any unsaturated part of carbocyclic type contains one or more ethylenic unsaturations, preferably one, two or three. It advantageously contains from 6 to 50 and better still from 6 to 20 carbon atoms, for example from 6 to 18 carbon atoms. Examples of unsaturated carbocycles are $C_6$-$C_{10}$ cycloalkenyl groups.

Examples of aromatic carbocyclic radicals are ($C_6$-$C_{18}$) aryl and better still ($C_6$-$C_{12}$)aryl groups and especially phenyl, naphthyl, anthryl and phenanthryl.

A group containing both a hydrocarbon-based aliphatic part as defined above and a carbocyclic part as defined above is, for example, an arylalkyl group such as benzyl, or an alkylaryl group such as tolyl.

The substituents on the hydrocarbon-based aliphatic groups or parts and on the carbocyclic groups or parts are, for example, alkoxy groups in which the alkyl part is preferably as defined above.

The term "hydrolyzable monovalent group" that is concerned hereinabove as regards the symbols $G^2$ and $G^6$ means groups such as, for example: halogen atoms, especially chlorine; groups —O-$G^7$ and —O—CO-$G^7$ in which $G^7$ represents: a saturated or unsaturated aliphatic hydrocarbon-based group, or a saturated, unsaturated and/or aromatic, monocyclic or polycyclic carbocyclic group, or a group containing a saturated or unsaturated aliphatic hydrocarbon-based part and a carbocyclic part as defined above, $G^7$ possibly being halogenated and/or substituted with one or more alkoxy groups; groups —O—N═C$G^8G^9$ in which $G^8$ and $G^9$ independently take any of the meanings given above for $G^7$, $G^8$ and $G^9$ possibly being halogenated and/or optionally substituted with one or more alkoxy groups; groups —O—N$G^8G^9$ in which $G^8$ and $G^9$ are as defined above.

Advantageously, such a hydrolyzable monovalent group is a radical as follows: linear or branched $C_1$-$C_8$ alkoxy optionally halogenated and/or optionally substituted with one or more ($C_1$-$C_8$)alkoxy; $C_2$-$C_9$ acyloxy optionally halogenated or optionally substituted with one or more ($C_1$-$C_8$)alkoxy; $C_5$-$C_{10}$ cycloalkyloxy; or $C_6$-$C_{18}$ aryloxy. By way of example, the hydrolyzable group is methoxy, ethoxy, n-propoxy, isopropoxy, n-butoxy, methoxymethoxy, ethoxyethoxy, methoxyethoxy, β-chloropropoxy, β-chloroethoxy or acetoxy.

As monovalent carbocyclic groups that may be formed, in formula (I), by the substituents $G^1$ and $G^2$ together and the silicon atom to which they are attached, mention will be made, for example, of the rings:

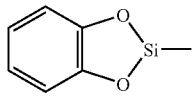 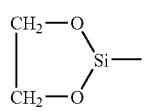

As single rings that may be formed on the one hand by the substituents $G^3$ and $G^4$ together on the nitrogen atom present in the symbol A of formula (I) and on the other hand by the substituents $R^2$ and $R^3$ of the nitrogen atom present in the symbol J of formula (III), mention will be made, for example, of the following rings in which the free valency is borne by a nitrogen atom: pyrrole, imidazole, pyrazole, pyrrolidine, Δ2-pyrroline, imidazolidine, Δ2-imidazoline, pyrazolidine, Δ3-pyrazoline, piperidine; preferred examples are: pyrrole, imidazole and pyrazole.

Among the functionalized organosilicon compounds (A1), those that are suitable (compounds named SA1-1) are the compounds:
consisting of:
(i) functionalized organosilanes corresponding to formula (I) in which: $a+a'=3$; $m=n=o=p=0$ (zero); and $q=1$;
(2i) functionalized siloxane oligomers corresponding to formula (I) in which: $a+a'=1$ or 2; m is in the range from 1 to 2; $n=p=o=0$ (zero); and $q=1$;
(3i) mixtures of species (i) and/or (2i);
and of the structures for which:
the symbols $G^0$, which may be identical or different, each represent one of the radicals chosen below for $G^1$ or $G^2$;
the symbols $G^1$, which may be identical or different, each represent: a linear or branched $C_1$-$C_8$ alkyl radical; a $C_5$-$C_{10}$ cycloalkyl radical or a $C_6$-$C_{18}$ aryl radical;
the symbols $G^2$, which may be identical or different, each represent: a hydroxyl radical or a linear or branched $C_1$-$C_8$ alkoxy radical, optionally substituted with one or more ($C_1$-$C_8$)alkoxy radicals;
Z represents the divalent radical —Z'—Z"— in which:
Z' represents: a $C_1$-$C_8$ alkylene chain; a saturated $C_5$-$C_{10}$ cycloalkylene group; a $C_6$-$C_{18}$ arylene group; or a divalent group consisting of a combination of at least two of these radicals;
Z" represents: a valency bond, —O— or —NR$^4$—, with $R^4$ being: a hydrogen atom; a linear or branched $C_1$-$C_8$ alkyl radical; a $C_5$-$C_{10}$ cycloalkyl radical; a $C_6$-$C_{18}$ aryl radical; or a ($C_6$-$C_{18}$)aryl-($C_1$-$C_8$)alkyl radical;
A denotes a group —O-$G^3$ or —NG$^4$G$^3$ in which $G^3$ and $G^4$, which may be identical or different, each represent: a linear or branched $C_1$-$C_8$ alkyl radical; a $C_5$-$C_{10}$ cycloalkyl radical or a $C_6$-$C_{18}$ aryl radical.

Among the functionalized organosilicon compounds (A1), those that are more particularly suitable (compounds named SA1-2) are the compounds
consisting of:
(i) functionalized organosilanes corresponding to formula (I) in which: $a+a'=3$; $m=n=o=p=0$ (zero); and $q=1$;
(2i) functionalized siloxane oligomers corresponding to formula (I) in which: $a+a'=1$ or 2; m is in the range from 1 to 2; $n=p=o=0$ (zero); and $q=1$;
(3i) mixtures of species (i) and/or (2i);
and of the structures for which:
the symbols $G^0$, which may be identical or different, each represent one of the radicals chosen below for $G^1$ or $G^2$;
the symbols $G^1$, which may be identical or different, are chosen from the group formed by methyl, ethyl, propyl, isopropyl, cyclohexyl and phenyl radicals;
the symbols $G^2$, which may be identical or different, are chosen from the group formed by hydroxyl, methoxy, ethoxy, n-propoxy, isopropoxy, n-butoxy, methoxymethoxy, ethoxyethoxy and methoxyethoxy radicals;
Z represents the divalent radical —Z'—Z"— in which:
Z' represents: a $C_1$-$C_8$ alkylene chain;
Z" represents: a valency bond, —O— or —NR$^4$—, with $R^4$ being chosen from the group formed by: hydrogen and methyl, ethyl, propyl, isopropyl, n-butyl, isobutyl, t-butyl, pentyl, hexyl, cyclohexyl and benzyl radicals;
A denotes a group —O-$G^3$ or —NG$^4$G$^3$ in which $G^3$ and $G^4$, which may be identical or different, are chosen from the group formed by methyl, ethyl, propyl, isopropyl, cyclohexyl and phenyl radicals.

Among the functionalized organosilicon compounds (A1), those that are especially suitable (compounds named SA1-3) are the compounds:
consisting of:
(i) functionalized organosilanes corresponding to formula (I) in which: $a+a'=3$; $m=n=o=p=0$ (zero); and $q=1$;
(2i) functionalized siloxane oligomers corresponding to formula (I) in which: $a+a'=1$ or 2; m is in the range from 1 to 2; $n=p=o=0$ (zero); and $q=1$;
(3i) mixtures of species (i) and/or (2i):
and of the structures for which:
the symbols $G^0$, which may be identical or different, each represent one of the radicals chosen below for $G^1$ or $G^2$;
the symbols $G^1$, which may be identical or different, are chosen from the group formed by methyl, ethyl, propyl, isopropyl, cyclohexyl and phenyl radicals;
the symbols $G^2$, which may be identical or different, are chosen from the group formed by hydroxyl, methoxy, ethoxy, n-propoxy, isopropoxy and n-butoxy radicals;
Z represents the divalent radical —Z'—Z"— in which:
Z' is chosen from the group formed by the divalent radicals methylene, ethylene and propylene;
Z" represents: a valency bond, —O— or —NR$^4$—, with $R^4$ being a hydrogen atom;
A denotes a group —O-$G^3$ in which $G^3$ is chosen from the group formed by methyl, ethyl, propyl, isopropyl, cyclohexyl and phenyl radicals.

As examples of functionalized organosilicon compounds (A1) that are especially suitable, mention will be made especially of the products of formula:

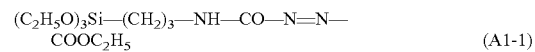 (A1-1)

mixtures of the species (A1-1) with the species (A1-1') and (A1-1") below:

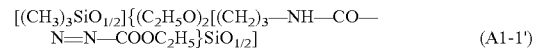 (A1-1')

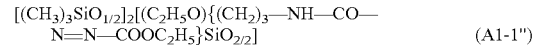 (A1-1")

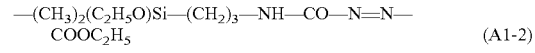 (A1-2)

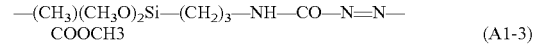 (A1-3)

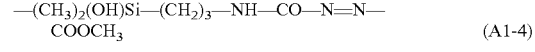 (A1-4)

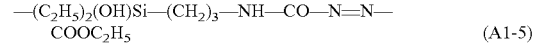 (A1-5)

—(CH₃)(CH₃O)₂Si—(CH₂)₃—CO—N=N—
  COOCH₃    (A1-6)

(CH₃)₂(OH)Si—(CH₂)₃CO—N=N—COOCH₃    (A1-7)

—(C₂H₅)₂(OH)Si—(CH₂)₃—CO—N=N—
  COOC₂H₅    (A1-8)

Among the polysulfur-containing organosilanes (A2), those that are suitable (silanes named SA2-1) are the "symmetrical" silanes of formula (II) in which:
  b represents an integer 1, 2 or 3;
  the symbols G⁵, which are identical or different, each represent: a linear or branched C₁-C₈ alkyl radical; a C₅-C₁₀ cycloalkyl radical or a C₆-C₁₈ aryl radical;
  the symbols G⁶, which are identical or different, each represent: a hydroxyl radical, a linear or branched C₁-C₈ alkoxy radical, optionally substituted by one or more (C₁-C₈)alkoxy radicals;
  M represents: a C₁-C₈ alkylene chain; a saturated C₅-C₁₀ cycloalkylene group; C₆-C₁₈ arylene group; or a divalent group composed of a combination of at least two of these radicals;
  m is 1;
  x represents a whole or fractional number ranging from 2 to 4.

Among the polysulfur-containing organosilanes (A2), those that are more particularly suitable (silanes named SA2-2) are the silanes of formula (II) in which:
  b represents an integer 1, 2 or 3;
  the symbols G⁵, which are identical or different, are chosen from the group formed by the methyl, ethyl, propyl, isopropyl, cyclohexyl and phenyl radicals;
  the symbols G⁶, which are identical or different, are chosen from the group formed by the hydroxyl, methoxy, ethoxy, n-propoxy, isopropoxy, n-butoxy, methoxymethoxy, ethoxyethoxy and methoxyethoxy radicals;
  M represents: a C₁-C₈ alkylene chain;
  m is 1;
  x represents a whole or fractional number ranging from 2 to 4.

Among the polysulfur-containing organosilanes (A2), those that are especially suitable (silanes named SA2-3) are the silanes of formula (II) in which:
  b represents an integer 1, 2 or 3;
  the symbols G⁵, which are identical or different, are chosen from the group formed by the methyl, ethyl, propyl, isopropyl, cyclohexyl and phenyl radicals;
  the symbols G⁶, which are identical or different, are chosen from the group formed by the hydroxyl, methoxy, ethoxy, n-propoxy and isopropoxy radicals;
  M is chosen from the group formed by the divalent methylene, ethylene and propylene radicals;
  m is 1;
  x represents a whole or fractional number ranging from 2 to 4.

Examples of polysulfur-containing organosilanes (A2) which are especially suitable include more particularly the following:
  the bistriethoxysilylpropyl disulfide (abbreviated TESPD) of formula:

(C₂H₅O)₃Si—(CH₂)₃—S₂—(CH₂)₃—Si(OC₂H₅)₃    (A2-1)

the bistriethoxysilylpropyl tetrasulfide (abbreviated TESPT) of formula:

(C₂H₅O)₃Si—(CH₂)₃—S₄—(CH₂)₃—Si(OC₂H₅)₃    (A2-2)

the bismonohydroxydimethylsilylpropyl tetrasulfide of formula:

(HO)(CH₃)₂Si—(CH₂)₃—S₄—(CH₂)—₃—Si(CH₃)₂
  (OH)    (A2-3)

the bismonoethoxydimethylsilylpropyl disulfide (abbreviated MESPD) of formula:

(C₂H₅O)(CH₃)₂Si—(CH₂)₃—S₂—(CH₂)₃—Si(CH₃)₂
  (OC₂H₅)    (A2-4)

the bismonoethoxydimethylsilylpropyl tetrasulfide (abbreviated MESPT) of formula:

(C₂H₅O)(CH₃)₂Si—(CH₂)₃—S₄—(CH₂)₃—Si(CH₃)₂
  (OC₂H₅)    (A2-5)

The functionalized organosilicon compounds (A1) of the type (i) may be prepared according to a synthetic process comprising the following steps:

(a): a precursor silane of formula:

(G²)ₐ(G¹)ₐ′Si—P¹ is reacted with a precursor hydrazo derivative of formula:

P²—NH—NH—CO-A in which formulae the symbols G¹, G² and A are as defined above, a+a′=3 and P¹ and P² represent groups whose structure and functionality are such that these groups are capable of reacting with each other to give rise to the central chain —Z—CO— so as to lead to the hydrazo compound of formula:

(G²)ₐ(G¹)ₐ′Si—Z—CO—NH—NH—CO-A    (IV)

(b): the compound of formula (IV) is subjected to an oxidation reaction of the hydrazo group according to the following scheme:

(G²)ₐ(G¹)ₐ′Si—Z—CO—NH—NH—CO—A ⟶
                (IV)
(G²)ₐ(G¹)ₐ′Si—Z—CO—N=N—CO—A
                (I)

The oxidation of step (b) takes place readily by working using an oxidizing system based, for example, on N-bromosuccinimide and pyridine, used in stoichiometric amount or in excess relative to the latter.

In the case, for example, of the preparation of the functionalized organosilanes (A1) of formula (I) that are especially suitable for use, in the structure of which the symbol Z then represents the divalent radical —(CH₂)₃—NH—, the synthetic scheme that is applied is as follows:

(a): a precursor silane of formula:

(G²)ₐ(G¹)ₐ′Si—(CH₂)₃—NCO is reacted with a precursor hydrazo derivative of formula:

H₂N—NH—CO-A to give the hydrazo compound of formula:

(G²)ₐ(G¹)ₐ′Si—(CH₂)₃—NH—CO—NH—NH—
  CO-A    (IV)

(b): the compound of formula (IV) is subjected to an oxidation reaction of the hydrazo group according to the following scheme:

(G²)ₐ(G¹)ₐ′Si—(CH₂)₃—NH—CO—NH—NH—CO—A ⟶
                (IV)
(G²)ₐ(G¹)ₐ′Si—(CH₂)₃—NH—CO—N=N—CO—A
                (I)

With regard to the practical manner of implementing the process just described under (b), more details will be found in the content of FR-A-2340323.

The functionalized organosilicon compounds (A1) of the types (2i) and (3i) may be prepared according to a synthetic process that consists in:

oxidizing the hydrazo group of the precursor (IV) using an oxidizing system comprising at least one oxidizing agent (for example a halogen, for instance bromine) and at least one base (for example a mineral base, for instance $Na_2CO_3$), including an additional reagent chosen from a mono- or polyalkoxysilane (for example trimethylethoxysilane), and preferably working in an organic liquid medium (for example using a solvent such as dichloromethane).

One advantageous procedure for performing this process consists in:

placing in the reactor at room temperature (for example 23° C.): the precursor (IV), the base (its amount depending on the oxidizing agent used; for example, in the case of bromine, two molar equivalents of base are used relative to the bromine), the organic solvent and the additional reagent (its amount corresponding, for example, to at least one molar equivalent relative to the precursor), and then gradually adding to the reaction medium the oxidizing system (its molar amount being, for example, stoichiometric relative to that of the precursor).

The polysulfur-containing organosilanes (A2) may be prepared by various known synthesis processes which are described in numerous documents; mention will be made in particular of the following documents:

with regard to "symmetrical" polysulfur-containing silanes: EP-A-0680997, EP-A-1043357, WO-A-02/30939, WO-A-02/31041, WO-A-02/083719, U.S. Pat. No. 4,128,438;

with, regard to "asymmetrical" sulfur-containing silanes: EP-A-0074632, EP-A-0939081, EP-A-0945556, WO-A-03/002574, WO-A-03/053983, FR-A-2839720.

Some organosilanes (A2) are available commercially: TESPD is sold, for example, by the company Degussa under the name Si75 (in the form of a mixture of disulfide—at 75% by weight—and polysulfides), or else by the company GE-OSI under the name Silquest A1589; TESPT is sold, for example, by the company Degussa under the name Si69 (or X50S when in the form of a 50% by weight product on a carbon black support), or else by the company GE-OSI under the name Silquest A1289 (in both cases, a commercial mixture of polysulfides having an average value for the x of Sx in the formula (II) of around 4).

A person skilled in the art understands that the coupling agents (A1) and/or (A2) described above may be pregrafted onto the reinforcing inorganic fillers, especially onto silica, via their function(s) "Y", the reinforcing inorganic fillers thus precoupled could then be bonded to the elastomer via their free function(s) "X". The coupling agents (A1) and/or (A2) may also be pregrafted onto the isoprene elastomer via their function(s) "X", the elastomer thus functionalized then possibly being bonded to the inorganic filler via their free function(s) "Y". It is preferred, however, especially for reasons of better use of the rubber compositions in crude form, to use all or part of the coupling agents either grafted onto the filler, or in free form (i.e. ungrafted).

SECOND SUBJECT OF THE INVENTION

A second subject of the present invention concerns compositions comprising:
(B) at least one isoprene elastomer,
(C) a reinforcing inorganic filler, and
(A) an adequate amount of the coupling system consisting of the particular combination residing in the combination of ingredients (A1) and (A2) indicated above.

More specifically, these compositions comprise (the parts being given on a weight basis):

per 100 parts of isoprene elastomer(s),
from 10 to 200 parts of inorganic filler (C), preferably from 30 to 150 parts and more preferentially from 40 to 120 parts,
an amount of combinations (A1)+(A2) that provides in each composition:
0.5 to 15 parts and preferably 1 to 10 parts of ingredient (A1), and
0.5 to 15 parts and preferably 1 to 10 parts of ingredient (A2).

Advantageously, the amount of combination (A1)+(A2), in which the proportions of ingredients (A1) and (A2) are chosen in the abovementioned general and preferential regions, is determined such that it represents from 1% to 20%, preferably from 2% to 15% and more particularly from 3% to 10% relative to the weight of the reinforcing inorganic filler.

More advantageously, the proportions of the ingredients (A1) and (A2), on the one hand, chosen in the abovementioned general and preferential regions, and, on the other hand, giving a sum (A1)+(A2) advantageously lying in the abovementioned general and preferential regions, are also determined such that the ingredient (A1)/ingredient (A2) weight ratio is in the range from 0.1 to 10, preferably from 0.15 to 5 and more preferentially from 0.3 to 3.

We will return hereinbelow to the definitions of the compound (B) consisting of at least one isoprene elastomer, and of compound (C) consisting of a reinforcing inorganic filler.

The term "isoprene elastomers" that are used for the compositions in accordance with the second subject of the invention more specifically means:

(1) the synthetic polyisoprenes obtained by homopolymerization of isoprene or 2-methyl-1,3-butadiene;
(2) the synthetic polyisoprenes obtained by copolymerization of isoprene with one or more ethylenically unsaturated monomers chosen from:
(2.1) conjugated diene monomers, other than isoprene, containing from 4 to 22 carbon atoms, for instance: 1,3-butadiene, 2,3-dimethyl-1,3-butadiene, 2-chloro-1, 3-butadiene (or chloroprene), 1-phenyl-1,3-butadiene, 1,3-pentadiene, 2,4-hexadiene;
(2.2) aromatic vinyl monomers containing from 8 to 20 carbon atoms, for instance: styrene, ortho-, meta- or para-methylstyrene, the commercial mixture "vinyltoluene", para-tert-butylstyrene, methoxystyrenes, chlorostyrenes, vinylmesitylene, divinylbenzene, vinylnaphthalene;
(2.3) vinyl nitrile monomers containing from 3 to 12 carbon atoms, for instance acrylonitrile or methacrylonitrile;
(2.4) acrylic ester monomers derived from acrylic acid or methacrylic acid with alkanols containing from 1 to 12 carbon atoms, for instance methyl acrylate, ethyl acrylate, propyl acrylate, n-butyl acrylate, isobutyl acrylate, 2-ethylhexyl acrylate, methyl methacrylate, ethyl methacrylate, n-butyl methacrylate or isobutyl methacrylate;

(2.5) a mixture of several of the abovementioned monomers (2.1) to (2.4);

the polyisoprene copolymers containing between 99% and 20% by weight of isoprene units and between 1% and 80% by weight of diene, aromatic vinyl, vinyl nitrile and/or acrylic ester units, and consisting, for example, of poly(isoprene-butadiene), poly(isoprene-styrene) and poly(isoprene-butadiene-styrene);

(3) natural rubber;

(4) the copolymers obtained by copolymerization of isobutene and isoprene (butyl rubber), and also the halogenated versions, in particular the chlorinated or brominated versions, of these copolymers;

(5) a mixture of several of the abovementioned elastomers (1) to (4);

(6) a mixture containing a major amount (ranging from 51% to 99.5% and preferably from 70% to 99% by weight) of abovementioned elastomer (1) or (3) and a minor amount (ranging from 49% to 0.5% and preferably from 30% to 1% by weight) of one or more diene elastomers other than isoprene elastomers.

The expression "diene elastomer other than isoprene elastomer" means, as is known: the homopolymers obtained by polymerization of one of the conjugated diene monomers defined above in point (2.1), for instance polybutadiene and polychloroprene; the copolymers obtained by copolymerization of at least two of the abovementioned conjugated dienes (2.1) with each other or by copolymerization of one or more of the abovementioned conjugated dienes (2.1) with one or more of the abovementioned unsaturated monomers (2.2), (2.3) and/or (2.4), for instance poly(butadiene-styrene) and poly(butadiene-acrylonitrile); ternary copolymers obtained by copolymerization of ethylene, of an α-olefin containing from 3 to 6 carbon atoms with a non-conjugated diene monomer containing from 6 to 12 carbon atoms, for instance the elastomers obtained from ethylene or propylene with a non-conjugated diene monomer of the abovementioned type such as, especially, 1,4-hexadiene, ethylidene-norbornene, dicyclopentadiene (EPDM elastomer).

Use is preferentially made of one or more isoprene elastomers chosen from: (1) synthetic polyisoprene homopolymers; (2) synthetic polyisoprene copolymers consisting of poly(isoprene-butadiene), poly(isoprene-styrene) and poly(isoprene-butadiene-styrene); (3) natural rubber; (4) butyl rubber; (5) a mixture of the abovementioned elastomers (1) to (4); (6) a mixture containing a major amount of abovementioned elastomer (1) or (3) and a minor amount of diene elastomer other than isoprene elastomer consisting of polybutadiene, polychloroprene, poly(butadiene-styrene), poly(butadiene-acrylonitrile) and a terpolymer (conjugated ethylene-propylene-diene monomer).

Use is more preferentially made of one or more isoprene elastomers chosen from: (1) synthetic polyisoprene homopolymers; (3) natural rubber; (5) a mixture of the abovementioned elastomers (1) and (3); (6) a mixture containing a major amount of abovementioned elastomer (1) or (3) and a minor amount of diene elastomer other than isoprene elastomer, consisting of polybutadiene and poly(butadiene-styrene).

In the present specification, the term "reinforcing inorganic filler" means, as is known, an inorganic or mineral filler, irrespective of its color and its origin (natural or synthetic), also known as a "white" filler or occasionally a "clear" filler, as opposed to carbon black. The expression "reinforcing inorganic filler" also includes in its definition mixed fillers based on "white" filler and on carbon black. This inorganic filler should be capable of reinforcing, by itself, without any means other than an intermediate coupling agent, a technical rubber composition, in other words capable of replacing, in its reinforcing function, a conventional filler based only on carbon black.

The reinforcing inorganic filler may be in any physical state, i.e. said filler may be in the form of powder, granules or beads (micropearls).

Preferentially, the reinforcing inorganic filler or compound (C) consists of silica, alumina, carbon black totally or partially covered with silica and/or alumina, or a mixture of these species.

More preferentially, the reinforcing inorganic filler consists of silica, taken alone or as a mixture with alumina.

As silicas that may be used in the invention, all precipitated silicas and fumed silicas (combustion silica) known to those skilled in the art, preferably having a BET specific surface area of less than or equal to 450 m$^2$/g, are suitable for use. Precipitated silicas are preferred, the latter possibly being standard or highly dispersible.

The term "highly dispersible silica" means any silica having a very high capacity for disintegration and dispersion in a polymer matrix, which may be observed by electron microscopy or optical microscopy, on thin slices. Among the highly dispersible precipitated silicas that may be used, in particular, are those with a CTAB specific surface area of less than or equal to 450 m$^2$/g and preferably between 30 and 400 m$^2$/g, and in particular those described in U.S. Pat. No. 5,403,570 and patent applications WO-A-95/09127 and WO-A-95/09128, the contents of which are incorporated herein. As nonlimiting examples of such abovementioned preferential highly dispersible silicas, mention may be made of the silicas Zeosil 1165 MP and 1115 MP from the company Rhodia, the silicas BV3380 and Ultrasil 7000 from the company Degussa, the silicas Hi-Sil 2000 and Hi-Sil EZ 150G from the company PPG, the silicas Zeopol 8715, 8741, 8745 or 8755 from the company Huber. Treated precipitated silicas are also suitable for use, for instance the "aluminum-doped" silicas described in patent application EP-A-0 735 088, the content of which is also incorporated herein.

More preferentially, the precipitation silicas that are suitable for use are those having:
  a CTAB specific surface area of from 60 to 250 m$^2$/g and preferably from 80 to 230 m$^2$/g,
  a BET specific surface area of from 60 to 260 m$^2$/g and preferably from 80 to 240 m$^2$/g,
  a BET specific/CTAB specific surface area ratio of from 1.0 to 1.6.

Needless to say, the term "silica" also means blends of different silicas. The CTAB specific surface area is determined according to the method NFT 45007 of November 1987. The BET specific surface area is determined according to the Brunauer-Emmett-Teller method described in "The Journal of the American Chemical Society, Vol. 60, page 309 (1938)" corresponding to the NF standard ISO 9277 of December 1996.

A reinforcing alumina that is advantageously used is a highly dispersible alumina having:
  a BET specific surface area of from 30 to 400 m$^2$/g and preferably from 60 to 250 m$^2$/g,
  a mean particle size of not more than 500 nm and preferably not more than 200 nm, and
  a high content of reactive surface Al—OH functions, for example as described in document EP-A-0 810 258.

As nonlimiting examples of such reinforcing aluminas, mention may be made especially of the aluminas A125, CR125 and D65CR from the company Baïkowski.

As carbon blacks totally or partially covered with a "white" filler, mention may be made especially of the products of the Ecoblack range from the company Cabot, and in particular the product referenced CRX 2000.

As other examples of inorganic filler that may be used in the rubber compositions of the invention, mention may also be made of aluminum (oxide) hydroxides, aluminosilicates, titanium oxides, silicon carbides or nitrides, all of the reinforcing type as described, for example, in patent applications WO-A-99/28376, WO-A-00/73372, WO-A-02/053634, WO-A-2004/003067 and WO-A-2004/056915.

The compositions in accordance with the invention also contain an ingredient (D) comprising all or part of the other auxiliary additives and constituents usually used in the field of elastomer and rubber compositions.

Thus, all or some of the other constituents and additives below may be used:

as regards the curing system, mention may be made, for example, of:
- (D1): mandatorily, curing agents chosen from sulfur and sulfur-donating compounds, for instance thiuram derivatives; as regards sulfur, for example, it is used in a known manner at a content ranging from 0.5 to 10 and preferably from 0.5 to 5 parts by weight per 100 parts by weight of isoprene elastomer(s);
- (D2): optionally, curing accelerators, for instance guanidine derivatives and sulfenamide derivatives; such an activator, when one is used, is employed in a known manner in a content ranging from 0.5 to 10 and preferably from 0.5 to 5 parts by weight per 100 parts by weight of elastomer(s);
- (D3): optionally, curing activators, for instance zinc oxide, stearic acid and zinc stearate;

as regards other additive(s), mention may be made, for example, of:
- (D4): optionally, a conventional reinforcing filler consisting of carbon black; suitable carbon blacks include any carbon black, especially blacks of the type HAD, ISAF and SAF; nonlimiting examples of such carbon blacks that may be mentioned include the carbon blacks N115, N134, N234, N339, N347 and N375; the amount of carbon black is determined such that, on the one hand, the reinforcing inorganic filler used represents more than 50% of the weight of the inorganic filler+carbon black assembly, and, on the other hand, the total amount of reinforcing filler (inorganic filler+carbon black) remains within the ranges of values indicated above, for the reinforcing inorganic filler, with regard to the weight constitution of the compositions;
- (D5): optionally, a sparingly reinforcing or non-reinforcing conventional white filler, for instance clays, bentonite, talc, chalk, kaolin, titanium dioxide or a mixture of these species;
- (D6): optionally, protecting agents, for instance antioxidants and/or antiozonizers, for instance N-phenyl-N'-(1,3-dimethylbutyl)-p-phenylenediamine;
- (D7): optionally, plasticizers and implementation aids.

With regard to the implementation aids (D7), the compositions according to the invention may comprise covering agents for the reinforcing filler, containing, for example, the single function "Y", which are capable, in a known way, by virtue of improvement of the dispersion of the filler within the rubber matrix and of a lowering in the viscosity of the compositions, of enhancing the ease of use of the compositions in the unprocessed state. Aids of this kind consist, for example, of hydroxyl-containing or hydrolyzable silanes (more particularly alkyltriethoxysilanes), polyalkylene glycols (polyethylene glycols, for example), alkanolamines (trialkanolamines, for example), and α,ω-dihydroxylated polyorganosiloxanes. An implementation aid of this kind, when one is used, is employed in a proportion of 1 to 10 parts by weight, and preferably 2 to 8 parts, per 100 parts of reinforcing inorganic filler.

THIRD SUBJECT OF THE INVENTION

A third subject of the present invention concerns the process for preparing the elastomer compositions comprising a reinforcing inorganic filler and an effective amount of the coupling system. This process may be performed according to a standard procedure in two phases 1 and 2 in which:

phase 1 (known as the nonproductive "hot" step): all the necessary ingredients, with the general exception of the curing agent(s) (D1), are introduced into and blended in a standard internal mixer in one, two or more steps; by way of illustration, it is thus possible to introduce and blend all the ingredients defined below: elastomer(s) (B), inorganic filler (C), all or part of the coupling agent (A2), optionally all or part of the coupling agent (A1), optionally at least one covering agent (D7), optionally one (or more) curing accelerator(s) (D2), optionally one (or more) curing activator(s) (D3), optionally one (or more) protecting agent(s) (D6), optionally one (or more) non-white reinforcing filler(s) (D4), optionally one (or more) sparingly reinforcing or non-reinforcing white filler(s) (D5); the process is performed at a temperature of between 40 and 200° C. and preferably between 60 and 180° C.; one or more subsequent step(s) of thermomechanical work may be performed in the internal mixer, after dropping the mixture and intermediate cooling (cooling temperature preferably less than 100° C.), for the purpose of subjecting the compositions to an additional thermomechanical treatment, especially to further improve the dispersion of the reinforcing inorganic filler and of the coupling agents in the elastomeric matrix; during such a subsequent step(s), it is possible to introduce one and/or the other of the necessary ingredients mentioned above;

phase 2 (referred to as the productive "cold" phase): the mixture thus obtained is then taken up in an external mixer and the curing agent(s) and optionally one or more other ingredient(s) is (are) added thereto; by way of illustration, the following ingredients are thus added: optionally the rest of the coupling agent (A2), optionally all or the rest of the coupling agent (A1), one (or more) curing agent(s) (D1), optionally one (or more) curing accelerator(s) (D2), optionally one (or more) curing activator(s) (D3), optionally one (or more) protecting agent(s) (D6); the process is performed at a lower temperature, below 120° C. and preferably from 25 to 100° C.

Preferably, the process for preparing the elastomeric compositions is performed according to the standard procedure in two phases 1 and 2 in which:

the coupling agent (A2) is introduced in total during phase 1 at the same time as the reinforcing inorganic filler;

whereas the coupling agent (A1) is:
  either totally introduced during phase 1,
  or totally introduced during phase 2,
  or split between the two phases 1 and 2, the first fraction incorporated in phase 1 corresponding to a proportion of from 10% to 80% by weight, the second fraction incorporated in phase 2 corresponding to a proportion of from 20% to 90% by weight.

More preferably, the process for preparing the elastomeric composition is performed as indicated above with regard to the preferable procedure, but in this case by splitting the coupling agent (A1) over the two phases 1 and 2.

It should be noted that it is possible to introduce all or part of the coupling agents (A1) and/or (A2) in supported form (the placing on the support being performed beforehand) on a solid that is compatible with the chemical structures corresponding to these coupling agents; such a support consists especially of carbon black. For example, during the splitting of the coupling agents (A1) and/or (A2) over the two phases 1 and 2, it may be advantageous to introduce the coupling agent(s) into the external mixer of phase 2 after placing said coupling agent(s) on a support in order to facilitate their incorporation and dispersion.

The final composition obtained is then calendered, for example in the form of a sheet, a plaque or a profile that may be used for the manufacture of elastomeric articles.

The curing (or vulcanization) is performed, in a known manner, at a temperature generally ranging from 130 to 200° C., for a sufficient time that may range, for example, between 5 and 90 minutes as a function especially of the curing temperature, the curing system used and the curing kinetics of the composition under consideration.

It goes without saying that the present invention, taken in its second subject, concerns the elastomer compositions described above both in crude form (i.e. before curing) and in cured form (i.e. after crosslinking or curing).

FOURTH SUBJECT OF THE INVENTION

A fourth subject of the present invention concerns isoprene elastomeric articles having a body comprising the compositions described above in the context of the second subject of the invention. The present invention is particularly useful for preparing articles consisting, for example, of engine supports, shoe soles, rollers for cable cars, seals for electrical household appliances and cable sheaths.

The examples that follow illustrate the present invention.

EXAMPLE 1

This example illustrates the preparation of a coupling agent of the type (A1-1).
The following reaction scheme was adopted:

$(C_2H_5O)_3Si—(CH_2)_3—NCO + H_2N—NH—COOC_2H_5$
$(C_2H_5O)_3Si—(CH_2)_3—NH—CO—NH—NH—COOC_2H_5$

1) Synthesis of the Precursor Ingredient:
1.1) Load Materials

| | | |
|---|---|---|
| 96% Isocyanatopropyltriethoxysilane | 99.8 g | 384 mmol |
| Ethyl carbazate | 41.2 g | 384 mmol |
| Anhydrous toluene | 384 ml | — |

1.2) Operating Protocol

The ethyl carbazate and the anhydrous toluene are placed at room temperature (23° C.) in the reactor, which is placed under an argon atmosphere.

The reactor is stirred at 300 rpm and the reaction mixture is then heated to 60° C. The reaction mixture becomes virtually homogeneous when hot.

The 99.8 g of silane are then added over 60 minutes using a pressure-equalized dropping funnel.

The reaction mixture is stirred for 2 hours at 60° C. and then cooled to room temperature.

The reaction mixture is left to stand for a few hours at room temperature.

A white solid crystallizes. It is then filtered off, washed with twice 150 ml of isopropyl ether and then drained under vacuum. The solid is finally oven-dried at 60° C. to constant weight m=131.5 g.

The product is analyzed by NMR (molar purity>99%). Yield=97.4%.

2) Synthesis of the Ingredient (A1-1):

The ingredient (A1-1) is obtained in one step from the precursor by oxidation of the hydrazino function to an azo function using an oxidizing system based on N-bromosuccinimide (NBS) and pyridine added in stoichiometric amounts relative to the precursor.

2.1) Load Materials

| | | |
|---|---|---|
| Precursor | 20.0 g | 57 mmol |
| 99% N-Bromosuccinimide | 10.13 g | 57 mmol |
| Pyridine | 4.5 g | 57 mmol |
| Dichloromethane | 100 ml | — |

2.2) Operating Protocol:

The precursor, the pyridine and the dichloromethane are placed in a reactor, which is placed under an argon atmosphere; the reaction medium is homogeneous and virtually colorless.

The N-bromosuccinimide is added spatulawise over 30 minutes. The temperature is maintained below 25° C. From the very first addition of NBS, the reaction medium turns bright orange.

The reaction medium is stirred at room temperature for 2 hours after the end of addition of the NBS.

The reaction medium is concentrated under reduced pressure on a rotary evaporator.

The residue, which is in the form of an orange paste, is taken up in 100 ml of a heptane/iPr$_2$O mixture (1/1:vol/vol) and then filtered through a porosity 4 sinter funnel (125 ml). The filter cake is washed with a further 4 times 25 ml of the above solvent mixture.

The mother liquors are filtered a second time through the cake. The filtrate is concentrated under reduced pressure.

An odorless bright orange liquid is obtained: m=18.8 g. This liquid is analyzed by NMR; its molar composition is as follows: ingredient (A1-1) 94.5 mol %; precursor compound: 0.2 mol %; succinimide: 5 mol % and pyridine residues: 0.3%.

EXAMPLE 2

The aim of this example is to demonstrate the coupling performance qualities (white filler-elastomer) of a particular combination consisting of the combination:

of an ingredient (A1) consisting essentially of the organosilane of formula:

$(C_2H_5O)_3Si—(CH_2)_3—NH—CO—N=N—COOC_2H_5$ \hfill (A1-1)

and of an ingredient (A2) consisting essentially of the organosilane of formula:

$(C_2H_5O)_3Si—(CH_2)_3—S_4—(CH_2)_3—Si(OC_2H_5)_3$ \hfill (A2-2)

These performance qualities are compared on the one hand with that of a coupling agent based on ingredient (A1) used alone and on the other hand with that of a coupling agent based on ingredient (A2) used alone.

4 representative elastomer compositions of shoe sole formulations are compared. These 4 compositions are identical except for the following differences:

composition 1 (control 1): no coupling agent present;
composition 2 (control 2): all of the coupling agent introduced in the internal mixer, providing 4 pce of silane (A2-2) in the composition;
composition 3 (control 3): coupling agent split between internal mixer (3.8 pce) and external mixer (1.5 pce), providing 5.3 pce of silane (A1-1) to the composition;
composition 4 (example 2): combination of coupling agents that give the composition 4.9 pce of silanes (A2-2) is (A1-1); the silane (A2-2) is introduced totally (1.9 pce) into the internal mixer, whereas the silane (A2-2) is split between internal mixer (1.5 pce) and external mixer (1.5 pce).

1) Constitution of the Elastomer Compositions:

Said compositions whose constitution, expressed as parts by weight per 100 parts of elastomers (pce), is indicated in table I given below are prepared in an internal mixer of Brabender type:

TABLE I

| Composition | Control 1 | Control 2 | Control 3 | Example 2 |
|---|---|---|---|---|
| NR (1) | 80 | 80 | 80 | 80 |
| BR (2) | 20 | 20 | 20 | 20 |
| Silica (3) | 50 | 50 | 50 | 50 |
| Coupling agent 1 (4) | — | 4.0 | — | 1.9 |
| Coupling agent 2 (5) | — | — | 3.8 | 1.5 |
| ZnO-80% | 3.75 | 3.75 | 3.75 | 3.75 |
| Stearic acid | 2.5 | 2.5 | 2.5 | 2.5 |
| Antioxidant (6) | 1.9 | 1.9 | 1.9 | 1.9 |
| Coupling agent 2 (5) | — | — | 1.5 | 1.5 |
| CBS-80% (7) | 1.88 | 1.88 | 1.88 | 1.88 |
| TBzTD (8) | 0.2 | 0.2 | 0.2 | 0.2 |
| Sulfur-80% | 1.88 | 1.88 | 1.88 | 1.88 |
| Carbon black (N330) | 4.0 | 4.0 | 4.0 | 4.0 |

Key:
(1) Natural rubber SMR - CV60 (supplied by the company Safic-Alcan).
(2) Polybutadiene or BR (Buna CB24 from the company Bayer) with 96% min of cis 1-4 and prepared by catalysis with neodymium.
(3) Silica (Z1165 MP from the company Rhodia) with BET and CTAB surface areas in the region of 150-160 m²/g.
(4) TESPT (Silquest A1289 from the company GE-Osi).
(5) Ethyl [(3-triethoxysilylpropyl)amino]carbonyl-diazenecarboxylate (synthesized according to the procedure described in example 1).
(6) N-1,3-Dimethylbutyl-N-phenyl-para-phenylenediamine (Santoflex 6-PPD from the company Flexsys).
(7) N-Cyclohexyl-2-benzothiazylsulfenamide (Rhenogran CBS-80 from the company Bayer)
(8) Tetrabenzylthiuram disulfide (Perkacit TBzTD from the company Flexsys).

The coupling agents are used in a silicon isomolar content, i.e. irrespective of the composition, the same number of moles of functions "Y" herein ["Y"=Si($OC_2H_5$)$_3$], which are reactive with silica and its surface hydroxyl groups, are used.

2) Preparation of the Elastomer Compositions:

The process for preparing the elastomer compositions is performed in two successive preparation phases. A first phase consists of a phase of thermomechanical work at high temperature. It is followed by a second phase of mechanical work at temperatures below 110° C. This phase allows the introduction of the curing system.

The first phase is performed using a blending machine, such as an internal mixer of Brabender brand (volume of 70 ml). The filling coefficient is 0.75. The initial temperature and the rotor speed are set each time so as to achieve mixture drop temperatures in the region of 140-160° C.

This makes it possible to incorporate the elastomers, and then the reinforcing filler (split introduction) with all or part of the coupling agent(s), followed by the various curing activators (stearic acid, zinc oxide) and the protecting agent (6-PPD). For this phase, the duration is between 5 and 10 minutes.

After cooling the mixture (temperature below 100° C.), the second phase allows the introduction of the curing system (sulfur and accelerators) and optionally the rest of the coupling agent(s) and optionally a conventional reinforcing filler (carbon black). It is performed in a roll mixer preheated to 50° C. The duration of this phase is between 2 and 6 minutes.

It should be noted that, when the amount of the coupling agent or agents is split between the two mixers, said coupling agent or agents is or are introduced in the roll mixer preferably after having been placed on a support (beforehand), using carbon black.

The final composition is then calendered in the form of plaques 2-3 mm thick.

On these crude mixtures, an evaluation of their Theological properties makes it possible to optimize the duration and the curing temperature.

Next, the mechanical and dynamic properties of the optimally cured mixtures are measured.

3) Rheometry of the Compositions:

The measurements are taken on the compositions in crude form. Table II collates the results concerning the rheology test, which is performed at 150° C. using an ODR Monsanto 100 S rheometer according to standard DIN 53529.

According to this test, the composition to be tested is placed in the test chamber set at a temperature of 150° C. for 30 minutes, and the resistant torque, opposed by the composition, to an oscillation of weak amplitude (3°) of a biconical rotor included in the test chamber is measured, the composition completely filling the chamber under consideration.

From the curve of variation of the torque as a function of the time, the following are determined:

the minimum torque (Tm), which reflects the viscosity of the composition at the temperature under consideration;
the maximum torque (TM);
the delta-torque ($\Delta T=TM-Tm$) which reflects the degree of crosslinking entrained by the action of the crosslinking system and, if any, of the coupling agents;
the time T98 necessary to obtain a curing state corresponding to 98% of complete curing (this time is taken as the optimum curing time); and
the scorch time TS2 corresponding to the time necessary to have a rise of 2 points above the minimum torque at the temperature under consideration (150° C.) and which reflects the time during which it is possible to use the crude mixtures at this temperature without having any initiation of curing.

The results obtained are indicated in table II.

TABLE II

| Reference | Control 1 | Control 2 | Control 3 | Example 2 |
|---|---|---|---|---|
| Tm (dN · m) | 20.5 | 15.5 | 39.1 | 22.8 |
| TM (dN · m) | 74.5 | 82.9 | 99.7 | 85.8 |
| Delta torque (dN · m) | 54 | 67.4 | 60.6 | 63 |
| TS 2 (min) | 6.27 | 7.92 | 8.82 | 8.92 |
| T98 (min) | 11.52 | 16.20 | 12.42 | 15.00 |
| Vcure max (dN · m/min) | 11.40 | 10.84 | 15.32 | 12.95 |

4) Mechanical Properties of the Cured Material:

The measurements are taken on the optimally cured compositions (T98) for a temperature of 150° C.

The uniaxial tensile tests are performed in accordance with the indications of standard NF T 46-002 with specimens of H2 type at a speed of 500 mm/min on an Instron 5564 machine. The 10%, 100% and 300% modulus values and the tensile strength are expressed in MPa; the elongation at break is expressed in %. It is possible to determine a reinforcing index from the ratio between the 300% modulus values and the modulus at 100% yield.

The Shore A hardness measurement on the cured materials is performed according to the indications of standard ASTM D 2240. The given value is measured at 15 seconds.

The measurement of the loss of mass by abrasion is performed according to the indications of standard DIN 53516, which uses a Zwick abrasimeter in which the cylindrical specimen is subjected to the action of an abrasive gauze of P60 grains and attached to the surface of a rotating drum at a contact pressure of 10N and over a course of 40 meters.

The value measured is a volume of loss of substance (in $mm^3$) after abrasion wear; the smaller the value, the better the abrasion resistance.

The properties measured are collated in table III.

TABLE III

| Reference | Control 1 | Control 2 | Control 3 | Example 2 |
|---|---|---|---|---|
| 10 modulus (MPa) | 0.84 | 0.9 | 1.00 | 0.87 |
| 100 modulus (MPa) | 1.49 | 3.21 | 5.19 | 3.49 |
| 200 modulus (MPa) | 2.64 | 7.8 | 15.06 | 10.25 |
| 300 modulus (MPa) | 4.62 | 13.38 | — | 18.55 |
| Tensile strength (MPa) | 20 | 28.2 | 16.8 | 28.3 |
| Elongation at break (%) | 685 | 551 | 215 | 430 |
| R.I. = 200/100 | 1.7 | 2.43 | 2.9 | 2.94 |
| R.I. = 300/100 | 3.10 | 4.17 | — | 5.32 |
| Shore A hardness-15s (pts) | 54 | 66 | 67 | 64 |
| Loss on abrasion 10N ($mm^3$) | 229 | 77 | 46 | 57 |

5) Dynamic Properties of the Cured Materials:

The mechanical properties are measured on a viscoanalyzer (Metravib VA3000) according to standard ASTM D5952.

The values for the loss factor (tan δ) and the complex dynamic compression modulus (E*) are recorded on cured samples (cylindrical specimen of cross section 95 $mm^2$ and of height 14 mm). The sample is subjected at the start to a 10% prebend and then to a sinusoidal compression bend alternating by plus or minus 2%. The measurements are taken at 60° C. and at a frequency of 10 Hz.

The results, presented in table IV, are the complex compression modulus (E*–60° C.–10 Hz) and the loss factor (tan δ–60° C.–10 Hz).

The loss factor (tan δ) and amplitude of elastic modulus in dynamic shear (ΔG') values are recorded on cured samples (parallelepipedal specimen of cross section 8 $mm^2$ and of height 7 mm). The sample is subjected to a sinusoidal bend in alternating double shear at a temperature of 40° C. and at a frequency of 10 Hz. The strain amplitude scanning processes are performed according to a to-and-fro cycle ranging from 0.1% to 50% followed by a return from 50% to 0.1%.

The results presented in table IV are obtained from the return strain amplitude scanning and concern the maximum value of the loss factor (tan δ max return–40° C.–10 Hz) and the amplitude of the elastic modulus (ΔG'–40° C.–10 Hz) between the values at 0.1% and 50% of strain (Payne effect).

TABLE IV

| Reference | Control 1 | Control 2 | Control 3 | Example 2 |
|---|---|---|---|---|
| E* - 60° C. - 10 Hz (MPa) | 9.04 | 8.60 | 8.90 | 7.85 |
| Tang δ - 60° C. - 10 Hz | 0.145 | 0.087 | 0.070 | 0.067 |
| Tang δ max return - 40° C. - 10 Hz | 0.176 | 0.134 | 0.094 | 0.098 |
| ΔG' - 40° C. - 10 Hz (MPa) | 3.15 | 1.71 | 1.04 | 1.06 |

Examination of the various tables II to IV shows that the composition in accordance with the invention (example 2) makes it possible to improve the compromise between reinforcement at large strains/ultimate traction properties/hysteresis properties relative to that which is obtained with the control compositions (controls 1 to 3). The composition of the invention reveals in particular a very substantially improved hysteresis as shown in table IV by the value of the loss factor (tan δ) at 60° C. which is significantly reduced.

The invention claimed is:

1. An elastomeric composition comprising:
(A) an effective amount of a coupling system which comprises the combination of constituents (A1) and (A2) where
(A1) comprises at least one coupling agent having the formula:

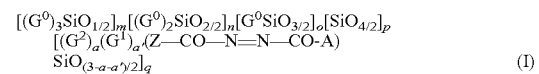

$$[(G^0)_3SiO_{1/2}]_m[(G^0)_2SiO_{2/2}]_n[G^0SiO_{3/2}]_o[SiO_{4/2}]_p$$
$$[(G^2)_a(G^1)_{a'}(Z—CO—N≡N—CO-A)$$
$$SiO_{(3-a-a'/2)}]_q \quad\quad\quad (I)$$

in which:
m, n, o and p each represent an integer or fraction greater than or equal to 0;
q represents an integer or fraction greater than or equal to 1;
a represents an integer selected from 0, 1, 2 and 3;
a' represents an integer selected from 0, 1 and 2;
the sum a+a' ranges from 0 to 3, where, when a=0, then at least one of the symbols $G^0$ has the definition given below for $G^2$; and when a+a'=3, then m=n=o=p=0 (zero);
the symbols $G^0$, which may be identical or different, each represent one of the groups corresponding to $G^2$ or $G^1$;
the symbols $G^2$, which may be identical or different, each represent a hydroxyl group or a hydrolyzable monovalent group;
the symbols $G^1$, which may be identical or different, each represent a saturated or unsaturated aliphatic hydrocarbon-based group; a saturated or unsaturated and/or aromatic, monocyclic or polycyclic carbocyclic group; or a group representing a saturated or unsaturated aliphatic hydrocarbon-based moiety and a carbocyclic moiety as defined above; with the proviso that a group $G^1$ may together form, with a group $G^2$ and the silicon atom from which $G^1$ and $G^2$ depend, a monocyclic or polycyclic carbocyclic group having from 2 to 10 ring carbon atoms and optionally comprising one or more ring oxygen heteroatom(s);
the symbol Z represents a divalent radical selected from:
a saturated or unsaturated aliphatic hydrocarbon-based group; a saturated, unsaturated and/or aromatic, monocyclic or polycyclic carbocyclic group; and a group containing a saturated or unsaturated aliphatic hydrocarbon-based moiety and a carbocyclic moiety as defined above; said divalent radical being optionally substituted or interrupted with an oxygen atom and/or a sulfur atom and/or a nitrogen atom, said nitrogen atom, if present, bearing one monovalent group selected from: a hydrogen atom; a saturated or unsaturated aliphatic hydrocarbon-based atom; a saturated or unsaturated and/or aromatic, monocyclic or polycyclic carbocyclic group; and a group containing a saturated or unsaturated aliphatic hydrocarbon-based moiety and a carbocyclic moiety as defined above;

the symbol A represents:
(a) a saturated or unsaturated aliphatic hydrocarbon-based group; a saturated or unsaturated and/or aromatic, monocyclic or polycyclic carbocyclic group; or a group comprising a saturated or unsaturated aliphatic hydrocarbon-based moiety and a carbocyclic moiety as defined above;
(b) a group —X-$G^3$ in which: X represents —O—, —S— or —N$G^4$- wherein $G^4$ is as defined above for $G^1$; $G^3$, which may be identical to or different from $G^4$, represents any of the groups $G^1$; with the proviso that the substituents $G^3$ and $G^4$ of the group —N$G^4G^3$ may together form with the nitrogen atom from which they depend, a single 5- to 7-membered ring having from 3 to 6 carbon atoms, 1 or 2 nitrogen atom(s) and, optionally, 1 or 2 unsaturated double bond(s);
or,
(c) when q=1, a group:

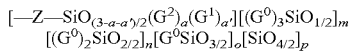

[—Z—SiO$_{(3-a-a')/2}$($G^2$)$_a$($G^1$)$_{a'}$][($G^0$)$_3$SiO$_{1/2}$]$_m$
[($G^0$)$_2$SiO$_{2/2}$]$_n$[$G^0$SiO$_{3/2}$]$_o$[SiO$_{4/2}$]$_p$ in which the symbols Z, $G^1$, $G^2$, a, a', m, n, o and p are as defined above;
(A2) comprises at least one coupling agent selected from the group consisting of:
(a) a polysulfur-containing "symmetrical" silane (A2-1) having the general formula:

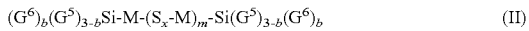

($G^6$)$_b$($G^5$)$_{3-b}$Si-M-(S$_x$-M)$_m$-Si($G^5$)$_{3-b}$($G^6$)$_b$  (II)

in which:
the symbols $G^6$ are as defined above for $G^2$;
the symbols $G^5$ are as defined above for $G^1$;
b represents an integer 1, 2 or 3;
m represents an integer 1 or 2;
x represents a whole or fractional number ranging from 2 to 6;
the symbols M are as defined above for Z; and
(b) a sulfur-containing "asymmetric" silane (A2-2) having the general formula:

($G^6$)$_b$($G^5$)$_{3-b}$Si-M-S$_z$-J  (III)

in which:
the symbols $G^6$, $G^5$, b and M are as defined above for the formula (II);
z represents a whole or fractional number ranging from 1 to 4;
the symbol J represents:
when z=1: a hydrogen atom or a group —CO—$R^1$;
when z is a whole or fractional number ranging from 2 to 4: a group —N$R^2R^3$ or a group Bzt or a group Bzt, (AA)y;
with $R^1$ being a saturated or unsaturated aliphatic hydrocarbon-based group, or a saturated, unsaturated and/or aromatic, monocyclic or polycyclic carbocyclic group, or a group having a saturated or unsaturated aliphatic hydrocarbon-based moiety and a carbocyclic moiety as defined above;

$R^2$ and $R^3$, which are identical or different, are each a hydrogen atom and/or any one of the groups represented by $R^1$; $R^2$ and $R^3$ may together form, with the nitrogen atom from which they depend, a single ring having 5 to 7 members, containing within the ring 3 to 6 carbon atoms, 1 or 2 nitrogen atom(s) and, optionally, 1 or 2 double bond(s);

the symbol Bzt representing the 2-benzothiazole group optionally substituted by one or more radicals selected from among a saturated aliphatic hydrocarbon-based group, or a saturated and/or aromatic, monocyclic or polycyclic carbocyclic group, or a group having a saturated aliphatic hydrocarbon-based moiety and a saturated and/or aromatic, monocyclic or polycyclic carbocyclic moiety;

the symbol AA representing an organic or inorganic, oxygen-containing monoacid or polyacid at least one of whose acid functions possesses an ionization constant in water, pKa, at 25° C. of more than 3; and y being a whole or fractional number other than 0 (zero) and not greater than 3, (B) at least one isoprene elastomer, and
(C) a reinforcing inorganic filler, and
said elastomer composition having a lower complex compression modulus (E*–60° C.–10 Hz) and/or a lower loss factor (Tang δ–60° C.–10 Hz) than that of a comparable composition comprising only one of coupling agents (A1) and (A2) at a concentration comparable to the total concentration of said coupling agents in said composition.

2. The elastomer composition as defined by claim 1, comprising (the parts being given on a weight basis):
per 100 parts of isoprene elastomer(s),
from 10 to 200 parts of inorganic filler (C),
an amount of combinations (A1)+(A2) that provides in each composition:
0.5 to 15 parts of constituent (A1), and
0.5 to 10 parts of constituent (A2).

3. The elastomer composition as defined by claim 2, comprising (the parts being given on a weight basis):
per 100 parts of isoprene elastomer(s),
from 30 to 150 parts of inorganic filler (C),
an amount of combinations (A1)+(A2) that provides in each composition:
1 to 10 parts of constituent (A1), and
0.8 to 8 parts of constituent (A2).

4. The elastomer composition as defined by claim 1, wherein the isoprene elastomer(s) is (are) selected from the group consisting of:
(1) synthetic polyisoprenes obtained by homopolymerization of isoprene or 2-methyl-1,3-butadiene;
(2) synthetic polyisoprenes obtained by copolymerization of isoprene with one or more ethylenically unsaturated monomers selected from the group consisting of:
(2.1) conjugated diene monomers, other than isoprene, containing from 4 to 22 carbon atoms;
(2.2) aromatic vinyl monomers having from 8 to 20 carbon atoms;
(2.3) vinyl nitrile monomers having from 3 to 12 carbon atoms;

(2.4) acrylic ester monomers derived from acrylic acid or methacrylic acid with alkanols having from 1 to 12 carbon atoms; and (2.5) a mixture of more than one of the above monomers (2.1) to (2.4);

the polyisoprene copolymers containing from 99% to 20% by weight of isoprene units and between 1% to 80% by weight of diene, aromatic vinyl, vinyl nitrile and/or acrylic ester structural units;

(3) natural rubber;

(4) the copolymers obtained by copolymerization of isobutene and isoprene (butyl rubber), and also the halogenated derivatives of these copolymers;

(5) a mixture of more than one of the above elastomers (1) to (4); and (6) a mixture containing a major amount ranging from 51% to 99.5% by weight of the above elastomer (1) or (3) and a minor amount ranging from 49% to 0.5% by weight of one or more diene elastomers other than isoprene elastomers.

5. The elastomer composition as defined by claim 4, comprising one or more isoprene elastomers selected from the group consisting of (1) synthetic polyisoprene homopolymers; (2) synthetic polyisoprene copolymers which comprise poly(isoprene-butadiene), poly(isoprene-styrene) or poly(isoprene-butadiene-styrene); (3) natural rubber; (4) butyl rubber; (5) a mixture of the above elastomers (1) to (4); and (6) a mixture containing a major amount of above elastomer (1) or (3) and a minor amount of diene elastomer other than isoprene elastomer comprising polybutadiene, polychloroprene, poly(butadiene-styrene), poly(butadiene-acrylonitrile) or a terpolymer (non-conjugated ethylene-propylene-diene monomer).

6. The elastomer composition as defined by claim 1, wherein the reinforcing inorganic filler comprises silica, whether alone or as a mixture with alumina.

7. The elastomer composition as defined by claim 6, wherein:
the silica is a precipitated silica having a BET specific surface area of less than or equal to 450 $m^2/g$,
the alumina is a highly dispersible alumina having a BET specific surface area of from 30 to 400 $m^2/g$ and a high content of reactive surface Al—OH functions.

8. The elastomer composition as defined by claim 1, further comprising auxiliary additives or constituents which comprise:
as regards the curing system:
(D1): curing agents selected from among sulfur and sulfur-donating compounds;
(D2): optionally, curing accelerators;
(D3): optionally, curing activators;
as regards other additive(s):
(D4): optionally, a conventional reinforcing filler comprising of carbon black;
(D5): optionally, a sparingly reinforcing or non-reinforcing conventional white filler;
(D6): optionally, protecting agents;
(D7): optionally, plasticizers and/or implementation aids.

9. The elastomeric composition as defined by claim 1, wherein said constituents (A1) consist essentially of:
(i) functionalized organosilanes corresponding to formula (I) in which: $a+a'=3$; $m=n=o=p=0$ (zero); and $q=1$;
(2i) functionalized siloxane oligomers corresponding to formula (I) in which: $a+a'=1$ or 2; m ranges from 1 to 2; $n=p=o=0$ (zero); and $q=1$;
(3i) mixtures of compounds (i), mixtures of compounds (2i) or mixtures of compounds (i) and (2i);
and of the compounds wherein:
the symbols $G^0$, which may be identical or different, each represent one of the radicals defined below for $G^1$ or $G^2$;
the symbols $G^1$, which may be identical or different, each represent a linear or branched $C_1$-$C_8$ alkyl radical; a $C_5$-$C_{10}$ cycloalkyl radical or a $C_6$-$C_{18}$ aryl radical;
the symbols $G^2$, which may be identical or different, each represent a hydroxyl radical or a linear or branched $C_1$-$C_8$ alkoxy radical, optionally substituted with one or more ($C_1$-$C_8$)alkoxy radicals;
Z represents the divalent radical —Z'—Z"— in which:
Z' represents a $C_1$-$C_8$ alkylene radical; a saturated $C_5$-$C_{10}$ cycloalkylene radical; a $C_6$-$C_{18}$ arylene radical; or a divalent radical comprising a combination of at least two such radicals;
Z" represents a valency bond, —O— or —$NR^4$—, wherein $R^4$ is a hydrogen atom; a linear or branched $C_1$-$C_8$ alkyl radical; a $C_5$-$C_{10}$ cycloalkyl radical; a $C_6$-$C_{18}$ aryl radical; or a ($C_6$-$C_{18}$)aryl-($C_1$-$C_8$)alkyl radical;
A is a group —O-$G^3$ or —$NG^4G^3$ in which $G^3$ and $G^4$, which may be identical or different, each represent a linear or branched $C_1$-$C_8$ alkyl radical; a $C_5$-$C_{10}$ cycloalkyl radical or a $C_6$-$C_{18}$ aryl radical.

10. The elastomeric composition as defined by claim 1, wherein said constituents (A1) comprise coupling agents for which each member is an organosilicon compound consisting essentially of:
(i) functionalized organosilanes corresponding to formula (I) in which: $a+a'=3$; $m=n=o=p=0$ (zero); and $q=1$;
(2i) functionalized siloxane oligomers corresponding to formula (I) in which: $a+a'=1$ or 2; m ranges from 1 to 2; $n=p=o=0$ (zero); and $q=1$;
(3i) mixtures of compounds (i), mixtures of compounds (2i) or mixtures of compounds (i) and (2i);
and of the compounds wherein:
the symbols $G^0$, which may be identical or different, each represent one of the radicals defined below for $G^1$ or $G^2$;
the symbols $G^1$, which may be identical or different, are selected from among methyl, ethyl, propyl, isopropyl, cyclohexyl and phenyl radicals;
the symbols $G^2$, which may be identical or different, are selected from among hydroxyl, methoxy, ethoxy, n-propoxy, isopropoxy, n-butoxy, methoxymethoxy, ethoxyethoxy and methoxyethoxy radicals;
Z represents the divalent radical —Z'—Z"— in which:
Z' represents a $C_1$-$C_8$ alkylene radical;
Z" represents a valency bond, —O— or —$NR^4$—, wherein $R^4$ is selected from among hydrogen and methyl, ethyl, propyl, isopropyl, n-butyl, isobutyl, t-butyl, pentyl, hexyl, cyclohexyl and benzyl radicals;
A is a group —O-$G^3$ or —$NG^4G^3$ in which $G^3$ and $G^4$, which may be identical or different, are selected from among methyl, ethyl, propyl, isopropyl, cyclohexyl and phenyl radicals.

11. The elastomeric composition as defined by claim 1, wherein said constituents (A1) comprise coupling agents for which each member is an organosilicon compound consisting essentially of:
(i) functionalized organosilanes corresponding to formula (I) in which: $a+a'=3$; $m=n=o=p=0$ (zero); and $q=1$;
(2i) functionalized siloxane oligomers corresponding to formula (I) in which: $a+a'=1$ or 2; m ranges from 1 to 2; $n=p=o=0$ (zero); and $q=1$;
(3i) mixtures of compounds (i), mixtures of compounds (2i) or mixtures of compounds (i) and (2i):

and of the compounds wherein:
- the symbols $G^0$, which may be identical or different, each represent one of the radicals defined below for $G^1$ or $G^2$;
- the symbols $G^1$, which may be identical or different, are selected from among methyl, ethyl, propyl, isopropyl, cyclohexyl and phenyl radicals;
- the symbols $G^2$, which may be identical or different, are selected from among hydroxyl, methoxy, ethoxy, n-propoxy, isopropoxy and n-butoxy radicals;
- Z represents the divalent radical —Z'—Z"— in which:
- Z' is selected from among the divalent radicals methylene, ethylene and propylene;
- Z" represents: a valency bond, —O— or —NR$^4$—, wherein R$^4$ is a hydrogen atom;
- A is a group —O-G$^3$ in which G$^3$ is selected from the group formed by methyl, ethyl, propyl, isopropyl, cyclohexyl and phenyl radicals.

12. The elastomeric composition as defined by claim 1, wherein said constituents (A2) are selected from among coupling agents in which each member is a compound consisting essentially of a "symmetrical" silane of formula (II) in which
- b represents an integer 1, 2 or 3;
- the symbols $G^5$, which are identical or different, each represent a linear or branched $C_1$-$C_8$ alkyl radical; a $C_5$-$C_{10}$ cycloalkyl radical or a $C_6$-$C_{18}$ aryl radical;
- the symbols $G^6$, which are identical or different, each represent a hydroxyl radical, a linear or branched $C_1$-$C_8$ alkoxy radical, optionally substituted by one or more ($C_1$-$C_8$)alkoxy radicals;
- M represents a $C_1$-$C_8$ alkylene radical; a saturated $C_5$-$C_{10}$ cycloalkylene radical; $C_6$-$C_{18}$ arylene radical; or a divalent radical comprising a combination of at least two such radicals;
- m is 1;
- x represents a whole or fractional number ranging from 2 to 4.

13. The elastomeric composition as defined by claim 1, wherein said constituents (A2) are selected from among coupling agents in which each member is a compound consisting essentially of a silane of formula (II) in which:
- b represents an integer 1, 2 or 3;
- the symbols $G^5$, which are identical or different, are selected from among methyl, ethyl, propyl, isopropyl, cyclohexyl and phenyl radicals;
- the symbols $G^6$, which are identical or different, are selected from among hydroxyl, methoxy, ethoxy, n-propoxy, isopropoxy, n-butoxy, methoxymethoxy, ethoxyethoxy and methoxyethoxy radicals;
- M represents: a $C_1$-$C_8$ alkylene radical;
- m is 1;
- x represents a whole or fractional number ranging from 2 to 4.

14. The elastomeric composition as defined by claim 1, wherein said constituents (A2) are selected from among coupling agents in which each member is a compound consisting essentially of a silane of formula (II) in which:
- b represents an integer 1, 2 or 3;
- the symbols $G^5$, which are identical or different, are selected from among methyl, ethyl, propyl, isopropyl, cyclohexyl and phenyl radicals;
- the symbols $G^6$, which are identical or different, are selected from among hydroxyl, methoxy, ethoxy, n-propoxy and isopropoxy radicals;
- M is selected from among divalent methylene, ethylene and propylene radicals;
- m is 1;
- x represents a whole or fractional number ranging from 2 to 4.

15. A process for preparing an elastomeric composition comprising
(A) an effective amount of a coupling system which comprises the combination of constituents (A1) and (A2) where
(A1) comprises at least one coupling agent having the formula:

$$[(G^0)_3SiO_{1/2}]_m[(G^0)_2SiO_{2/2}]_n[G^0SiO_{3/2}]_o[SiO_{4/2}]_p$$
$$[(G^2)_a(G^1)_{a'}(Z-CO-N=N-CO-A)$$
$$SiO_{(3-a-a'/2)}]_q \qquad (I)$$

in which:
- m, n, o and p each represent an integer or fraction greater than or equal to 0;
- q represents an integer or fraction greater than or equal to 1;
- a represents an integer selected from 0, 1, 2 and 3;
- a' represents an integer selected from 0, 1 and 2;
- the sum a+a' ranges from 0 to 3, where, when a=0, then at least one of the symbols $G^0$ has the definition given below for $G^2$; and when a+a'=3, then m=n=o=p=0 (zero);
- the symbols $G^0$, which may be identical or different, each represent one of the groups corresponding to $G^2$ or $G^1$;
- the symbols $G^2$, which may be identical or different, each represent a hydroxyl group or a hydrolyzable monovalent group;
- the symbols $G^1$, which may be identical or different, each represent a saturated or unsaturated aliphatic hydrocarbon-based group; a saturated or unsaturated and/or aromatic, monocyclic or polycyclic carbocyclic group; or a group representing a saturated or unsaturated aliphatic hydrocarbon-based moiety and a carbocyclic moiety as defined above; with the proviso that a group $G^1$ may together form, with a group $G^2$ and the silicon atom from which $G^1$ and $G^2$ depend, a monocyclic or polycyclic carbocyclic group having from 2 to 10 ring carbon atoms and optionally comprising one or more ring oxygen heteroatom(s);
- the symbol Z represents a divalent radical selected from: a saturated or unsaturated aliphatic hydrocarbon-based group; a saturated, unsaturated and/or aromatic, monocyclic or polycyclic carbocyclic group; and a group containing a saturated or unsaturated aliphatic hydrocarbon-based moiety and a carbocyclic moiety as defined above; said divalent radical being optionally substituted or interrupted with an oxygen atom and/or a sulfur atom and/or a nitrogen atom, said nitrogen atom, if present, bearing one monovalent group selected from; a hydrogen atom; a saturated or unsaturated aliphatic hydrocarbon-based atom; a saturated or unsaturated and/or aromatic, monocyclic or polycyclic carbocyclic group; and a group containing a saturated or unsaturated aliphatic hydrocarbon-based moiety and a carbocyclic moiety as defined above;
- the symbol A represents:
  (a) a saturated or unsaturated aliphatic hydrocarbon-based group; a saturated or unsaturated and/or aromatic, monocyclic or polycyclic carbocyclic group; or a group comprising a saturated or unsaturated aliphatic hydrocarbon-based moiety and a carbocyclic moiety as defined above;

(b) a group —X-G³ in which: X represents —O—, —S— or —NG⁴- wherein G⁴ is as defined above for G¹; G³, which may be identical to or different from G⁴, represents any of the groups G¹; with the proviso that the substituents G³ and G⁴ of the group —NG⁴G³ may together form with the nitrogen atom from which they depend, a single 5- to 7-membered ring having from 3 to 6 carbon atoms, 1 or 2 nitrogen atom(s) and, optionally, 1 or 2 unsaturated double bond(s);

or, (c) when q=1, a group:

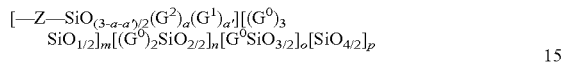

in which the symbols Z, G¹, G², a, a', m, n, o and p are as defined above;

(A2) comprises at least one coupling agent selected from the group consisting of:

(a) a polysulfur-containing "symmetrical" silane (A2-1) having the general formula:

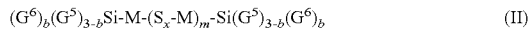

in which:

the symbols G⁶ are as defined above for G²;
the symbols G⁵ are as defined above for G¹;
b represents an integer 1, 2 or 3;
m represents an integer 1 or 2;
x represents a whole or fractional number ranging from 2 to 6;
the symbols M are as defined above for Z; and (b) a sulfur-containing "asymmetric" silane (A2-2) having the general formula:

in which:

the symbols G⁶, G⁵, b and M are as defined above for the formula (II);
z represents a whole or fractional number ranging from 1 to 4;
the symbol J represents;
  when z=1: a hydrogen atom or a group —CO—R¹;
  when z is a whole or fractional number ranging from 2 to 4: a group —NR²R³ or a group Bzt or a group Bzt, (AA)y;
  with R¹ being a saturated or unsaturated aliphatic hydrocarbon-based group, or a saturated, unsaturated and/or aromatic, monocyclic or polycyclic carbocyclic group, or a group having a saturated or unsaturated aliphatic hydrocarbon-based moiety and a carbocyclic moiety as defined above;
  R² and R³, which are identical or different, are each a hydrogen atom and/or any one of the groups represented by R¹; R² and R³ may together form, with the nitrogen atom from which they depend, a single ring having 5 to 7 members, containing within the ring 3 to 6 carbon atoms, 1 or 2 nitrogen atom(s) and, optionally, 1 or 2 double bond(s);

the symbol Bzt representing the 2-benzothiazole group optionally substituted by one or more radicals selected from among a saturated aliphatic hydrocarbon-based group, or a saturated and/or aromatic, monocyclic or polycyclic carbocyclic group, or a group having a saturated aliphatic hydrocarbon-based moiety and a saturated and/or aromatic, monocyclic or polycyclic carbocyclic moiety;

the symbol AA representing an organic or inorganic, oxygen-containing monoacid or polyacid at least one of whose acid functions possesses an ionization constant in water, pKa, at 25° C., of more than 3; and y being a whole or fractional number other than 0 (zero) and not greater than 3, (B) at least one isoprene elastomer,
(C) a reinforcing inorganic filler, and
(D) at least one curing agent;

said process, comprising the following two phases:
  phase 1: forming a mixture of the constituents (A), (B) and (C), optionally by introducing with the exception of the curing agent(s) (D), by introducing said constituents into and blended in an internal mixer, in one or more steps, at a temperature of from 40° to 200° C.;
  phase 2: forming the composition by transferring the mixture obtained in phase 1 to an external mixer and adding the at least one curing agent and optionally one or more other ingredient(s) to the mixture of the obtained in phase 1, at a temperature below 120° C.;

said elastomer composition having a lower complex compression modulus (E*-60° C.-10 Hz) and/or a lower loss factor (Tang δ-60° C.-10 Hz) than that of a comparable composition comprising only one of coupling agents (A1) and (A2) at a concentration comparable to the total concentration of said coupling agents in said composition.

16. The process as defined by claim 15, wherein:
the coupling agent (A2) is introduced in total during phase 1 at the same time as the inorganic filler; and
the coupling agent (A1) is:
  either totally introduced during phase 1,
  or divided between the two phases 1 and 2, where the first fraction incorporated in phase 1 corresponds to a proportion of from 10% to 80% by weight, the second fraction incorporated in phase 2 corresponds to a proportion of from 90% to 20% by weight.

17. An elastomeric shaped article comprising the composition as defined by claim 1.

18. The elastomer shaped article as defined by claim 17, wherein the article is an engine support, a shoe sole, a roller for cable cars, a seal for an electrical household appliance or a cable sheath.

* * * * *